(12) United States Patent
Califorrniaa

(10) Patent No.: US 11,475,793 B2
(45) Date of Patent: Oct. 18, 2022

(54) METHOD AND DEVICE FOR READING, WRITING, AND COMMUNICATION BY DEAFBLIND USERS

(71) Applicant: Eurica Califorrniaa, Laie, HI (US)

(72) Inventor: Eurica Califorrniaa, Laie, HI (US)

( * ) Notice: Subject to any disclaimer, the term of this patent is extended or adjusted under 35 U.S.C. 154(b) by 467 days.

(21) Appl. No.: 16/799,436

(22) Filed: Feb. 24, 2020

(65) Prior Publication Data

US 2020/0193870 A1 Jun. 18, 2020

Related U.S. Application Data

(60) Provisional application No. 62/809,673, filed on Feb. 24, 2019.

(51) Int. Cl.
*G09B 21/04* (2006.01)
*G09B 21/02* (2006.01)
(Continued)

(52) U.S. Cl.
CPC ........... *G09B 21/04* (2013.01); *G06F 3/0235* (2013.01); *G10L 13/00* (2013.01); *G10L 15/22* (2013.01); *G10L 15/26* (2013.01)

(58) Field of Classification Search
CPC .... G09B 21/04; G09B 21/007; G09B 21/003; G06F 3/0235
See application file for complete search history.

(56) References Cited

U.S. PATENT DOCUMENTS

| 4,414,537 A | 11/1983 | Grimes |
| 4,542,291 A | 9/1985 | Zimmerman |

(Continued)

FOREIGN PATENT DOCUMENTS

| CN | 101969487 A | * | 2/2011 | |
| CN | 102939791 B | * | 9/2015 | ............. G09B 21/04 |

(Continued)

OTHER PUBLICATIONS

Caeiro-Rodríguez et al., "A systematic review of commercial smart gloves: Current status and applications," Sensors, vol. 21, No. 8, 2021, 2667 (pp. 1-33).

(Continued)

*Primary Examiner* — Daniel J Colilla
(74) *Attorney, Agent, or Firm* — Boies Schiller Flexner LLP

(57) ABSTRACT

A method and device for reading, writing, and communication by deafblind users is provided to enable such exemplary functions as word processing, text messaging, Internet access, and telephonic communication. By combining a chordic keyboard for user input with a self-scrolling Braille pad for reading Braille, embodiments of the invention enable the user's hands to stay in place on a user console rather than having to constantly switch back and forth between typing messages versus reading or checking for messages. This in turn enables duplex communication because the user can read or acknowledge incoming messages even while typing. It also reduces the dynamic complexity experienced in reading Braille because a body part used for reading Braille can remain constantly available for receiving messages simply by resting in place on the self-scrolling Braille pad without any swiping, thereby eliminating swiping gestures and the problem of timing them with the receipt of messages.

20 Claims, 3 Drawing Sheets

(51) Int. Cl.
*G06F 3/023* (2006.01)
*G10L 15/22* (2006.01)
*G10L 13/00* (2006.01)
*G10L 15/26* (2006.01)

(56) References Cited

U.S. PATENT DOCUMENTS

| | | |
|---|---|---|
| 5,047,952 A | 9/1991 | Kramer et al. |
| 5,993,089 A | 11/1999 | Burrell, IV |
| 9,417,693 B2 | 8/2016 | Seth |
| 9,971,415 B2 | 5/2018 | Poupyrev et al. |
| 10,088,908 B1 | 10/2018 | Poupyrev et al. |
| 10,241,581 B2 | 3/2019 | Lien et al. |
| 10,319,257 B2 | 6/2019 | Bavunoglu et al. |
| 10,446,059 B2 | 10/2019 | Pryor |
| 10,601,980 B1* | 3/2020 | Engelke .............. G10L 15/26 |
| 10,642,367 B2 | 5/2020 | Poupyrev et al. |
| 11,030,540 B2 | 6/2021 | Kratz et al. |
| 11,145,223 B2 | 10/2021 | Califorrniaa |
| 11,237,640 B2 | 2/2022 | Zhu et al. |
| 2011/0216006 A1* | 9/2011 | Litschel .............. G09B 21/02 345/168 |
| 2016/0034180 A1* | 2/2016 | Labbé .................. G06F 3/0219 345/173 |
| 2018/0342176 A1 | 11/2018 | Califorrniaa |
| 2019/0005847 A1* | 1/2019 | Lim .................... G09B 21/004 |

FOREIGN PATENT DOCUMENTS

| | | | |
|---|---|---|---|
| JP | 2000267557 A | * 9/2000 | |
| KR | 20160113053 A | * 9/2016 | .......... G09B 21/003 |

OTHER PUBLICATIONS

Rajamohan et al., "Deaf-mute communication interpreter," International Journal of Scientific Engineering and Technology, vol. 2, No. 5, 2013, pp. 336-341.
Wikipedia (American Sign Language), https://en.wikipedia.org/wiki/American_Sign_Language (accessed Aug. 9, 2022).
Wikipedia (Fingerspelling), https://en.wikipedia.org/wiki/Fingerspelling (accessed Sep. 20, 2022).
Wikipedia (American manual alphabet), https://en.wikipedia.org/wiki/American_manual_alphabet (accessed Aug. 9, 2022).

* cited by examiner

METHOD AND DEVICE FOR READING, WRITING, AND COMMUNICATION BY DEAFBLIND USERS

INCORPORATED TEACHINGS

This application incorporates U.S. application Ser. No. 15/791,330 for self-scrolling Braille, filed on Oct. 23, 2017, and published as U.S. patent application publication No. US 2018/0342176 A1 (California) on Nov. 29, 2018, which is incorporated herein in its entirety by way of reference.

BACKGROUND OF THE INVENTION

1. Field of Invention

The invention relates to electronic methods and devices for reading, writing, and communication in Braille, specifically, to Braille teletype (TTY), more specifically, to methods and devices for reading, writing, and communication by deafblind users.

2. Prior Art

The deafblind communicate by employing such exemplary means as tactile signing and electronic devices for assisted communication. In the case of tactile signing, two parties must be touching as signer and recipient, and its use is generally limited to those trained in tactile signing. Accordingly, distance communication by the deafbind has relied on electronic devices or assistance from third parties who act as relays.

In this disclosure, a Braille reading and writing device (BRAW) means an electronic device enabling a user to read and write messages in Braille. Exemplary BRAWs include Braille notetakers and TeleBraille devices, also known as Braille TTY. A Braille notetaker is essentially a word processor for Braille users. A TeleBraille device is essentially a variety of Braille notetaker having a communication channel to send and receive messages which are typed and read in Braille on the notetaker. To read Braille, the BRAW provides a refreshable Braille display; to write Braille, the BRAW provides a keyboard or virtual keyboard for the user to type with.

An exemplary prior art keyboard is provided by a chordic keyboard, also known as a Perkins keyboard. To write Braille, key combinations corresponding to Braille characters are pressed as in typing.

In a prior art BRAW, a hand used for reading must switch back and forth between reading with a finger of the given hand versus typing with that hand. In the prior art BRAW, this is because reading requires the finger to be swiped over refreshable Braille cells, which means the corresponding hand is not free for the user to type with at the same time.

To communicate via TeleBraille, a deafblind user sends messages by typing on the keyboard and receives messages by reading them from the Braille display after they are rendered in Braille. In a typical scenario, the received message may undergo speech-to-text-to-Braille translation and the sent message may undergo translation from Braille-to-text to synthesized speech.

By means of TeleBraille, the deafblind can enjoy such exemplary utilities as telephonic communication.

A modern telephone enables duplex communication, such that two parties can talk and listen at the same time. That is to say, according to the art of duplex communication, parties can send and receive messages at the same time.

In contrast, according to the art of simplex communication, parties have to take turns sending and receiving messages. For orderly simplex communication, each party's turn at sending messages must conclude with an expression (e.g., "over") to signal the start of the other party's turn to send messages. It will be appreciated that prior art TeleBraille users are not well-disposed to sending messages (typing) and receiving messages (reading) at the same time because at least one of the fingers used for both typing and reading has to switch back and forth between the two. This configuration substantially limits the deafblind party to simplex communication.

It will further be appreciated that prior art TeleBraille users experience dynamic complexity in attempting to read received Braille messages by method of swiping a finger over refreshable Braille cells. Such complexity occurs, for example, due to an unpredictable duration of pauses from the sending party. For example, suppose the sending party says, "I'm going (pause) to the store." If the user swipes "I'm going" before the pause is complete, then the user will have to keep swiping at blank cells during the pause until "to the store" appears, or await a signal to recommence swiping once the cells are refreshed with the message "to the store."

3. Statement of the Necessity

It is important for deafblind users to have access to protocols for reading, writing, and communication that are functionally on par with what their peers are using.

What is needed is a method and device for reading, writing, and communication by deafblind users which enables duplex communication.

What is further needed is a method and device for reading, writing, and communication by deafblind users which reduces the dynamic complexity experienced in reading messages received in Braille from a sender in real time.

What is further needed is a method and device for reading, writing, and communication by deafblind users which eliminates the prior art need to switch back and forth between hands poised for typing versus hands poised for reading.

BRIEF SUMMARY OF THE INVENTION

The invention satisfies the above-stated needs.

It is an object of the invention to provide a method and device for reading, writing, and communication by deafblind users which enables duplex communication.

It is further an object of the invention to provide a method and device for reading, writing, and communication by deafblind users which reduces the dynamic complexity experienced in reading messages received in Braille from a sender in real time.

It is further an object of the invention to provide a method and device for reading, writing, and communication by deafblind users which eliminates the prior art need to switch back and forth between hands poised for typing versus hands poised for reading.

The invention satisfies these and other objects.

FIG. 1 illustrates a limitation of the prior art. FIG. 1 shows an exemplary BRAW 81 of the prior art comprising a user console 82 having disposed thereon a nine-key chordic keyboard 83 and a 14-cell 8-bit refreshable Braille display 84. As shown in FIG. 1, a right hand 35 having a right index finger 33 used for reading 85 Braille has to switch back and forth 86 between being poised in a typing position 87 versus being poised in a reading position 88.

In contrast, FIG. 2 shows a preferred embodiment of a deafblind reading, writing, and communication device 1 according to the invention. Referring to FIG. 2, according to the inventive device 1, with right and left hands 35, 45 resting on a user console 2, each of a user's eight fingers 30, 31, 32, 33, 40, 41, 42, 43 rests in contact with respective right- and left-hand keys 10, 11, 12, 13, 20, 21, 22, 23 of an 8-key chordic keyboard while right and left thumbs 34, 44 rest in contact with respective right and left self-scrolling Braille pads 14, 24.

Advantageously, according to the inventive device 1 the user's hands 35, 45 can remain poised for both reading and typing simultaneously 6. Consequently, there is no need to switch back and forth between hands poised for typing versus hands poised for reading.

Advantageously, according to the inventive device 1 at least one of the self-scrolling Braille pads 14, 24 can be dedicated to displaying messages received from a sender in real time via a communication channel.

Advantageously, compared to the prior art the inventive device 1 reduces the dynamic complexity experienced in reading messages received in Braille from a sender in real time, inasmuch as at least one of the thumbs 34, 44 remains in contact with at least one of the self-scrolling Braille pads 14, 24 to read the messages at the same time they are displayed.

Advantageously, with at least one of the thumbs 34, 44 remaining in contact with at least one of the self-scrolling Braille pads 14, 24, the inventive device 1 enables duplex communication via a communication channel because the user can read or acknowledge incoming messages even while typing a reply.

Advantageously, for inaudible activities such as text messaging and word processing, non-deaf blind users will enjoy the same advantages as deafblind users according to the inventive method and device.

These and other objects and advantages of the present invention will be appreciated in view of the detailed description to follow.

DETAILED DESCRIPTION OF THE INVENTION

Figure 1:
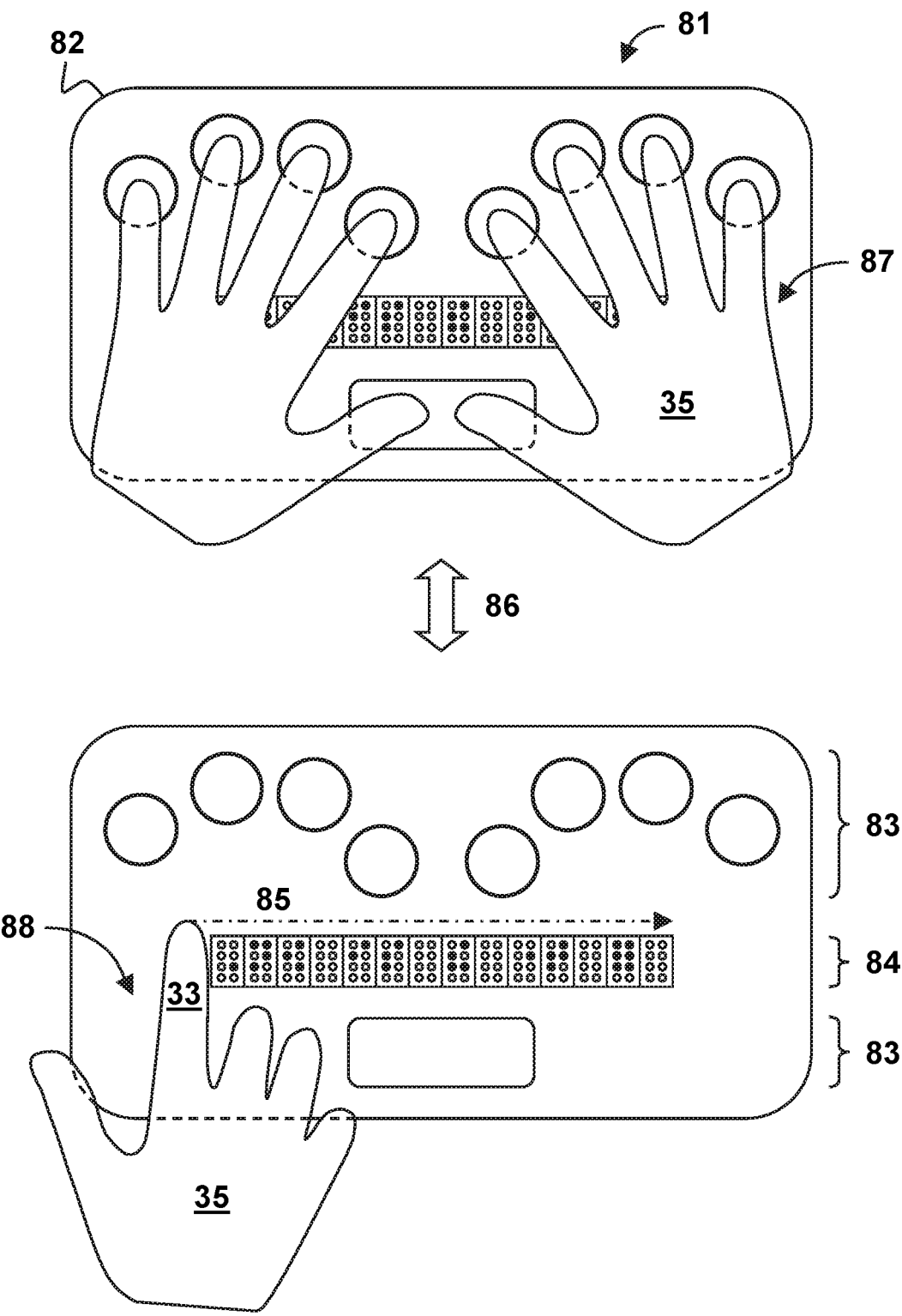
FIG. 1 is a top view of a prior art device for reading, writing, and communication by blind and deafblind users.

It is an object of the invention to provide a method and device for reading, writing, and communication by deafblind users which eliminates the need to switch back and forth between hands poised for typing versus hands poised for reading.

The invention satisfies this object in a way which provides additional advantages, including but not limited to enabling duplex communication and reducing the dynamic complexity experienced in reading messages received in Braille from a sender in real time.

Though specifically suited for deafblind users, the inventive method and device is also well-suited for non-deaf blind users as well; hence, the invention can also be called a method and device for reading, writing, and communication by blind and deafblind users.

1. Technical Background and Definitions

Methods and devices for self-scrolling Braille are disclosed in U.S. patent application publication No. US 2018/0342176 A1 (Califorrniaa). Also known as a self-scrolling Braille display or, more specifically, as a self-scrolling Braille hotspot, in this disclosure a self-scrolling Braille pad means a surface region of a tactile display for presenting self-scrolling Braille to a user for reading with a surface of the user's body which rests in stationary contact thereon.

A limitation of methods and devices relying on a swiping gesture to read Braille is that a cumulative distance traversed by the swiping results in what this disclosure calls "finger mileage." Advantageously, self-scrolling Braille eliminates finger mileage because the surface of the user's body used for reading rests on the self-scrolling Braille pad rather than having to swipe over Braille cells repetitively.

2. Preferred Embodiments

In a preferred embodiment of the inventive method, the invention is a method of deafblind reading, writing, and communication, comprising: (a) reading with a self-scrolling Braille pad configured for contact with a surface of a user's body; and, (b) writing with keystrokes, wherein the self-scrolling Braille pad is configured to maintain contact with said surface of the user's body during the writing.

According to the preferred embodiments, the keystrokes are typed with a keyboard or virtual keyboard. An exemplary keyboard is a chordic keyboard.

In this disclosure, the term keyboard means a keyboard in which keys are pressed or a virtual keyboard in which software is employed to interpret gestures as keystrokes.

According to the preferred embodiments, the self-scrolling Braille pad is disposed for reading in contact with such exemplary surfaces of the user's body as a digital pulp of a thumb, a digital pulp of a finger, a wrist, or a digital pulp of a toe. The digital pulp of the finger is also known as a finger pad.

According to exemplary modes of practice, the keystrokes are typed with fingers other than the finger or thumb which is in contact with the self-scrolling Braille pad.

According to a preferred embodiment of the inventive device, the invention is a device for deafblind reading, writing, and communication, comprising: a user keyboard and at least one self-scrolling Braille pad, wherein the keyboard and the at least one Braille pad are configured to allow the user to type with the keyboard while a surface of the user's body remains in contact with the at least one Braille pad for reading.

According to the preferred embodiments, the device further includes a computer or microcontroller configured for Braille usage according to the art and has at least one communication channel to send or receive data or messages, wherein the keyboard is configured for user input and the at least one Braille pad is configured as a character display.

According to the preferred embodiments, the at least one communication channel can be established according to the art via a microphone, speaker, signaler, haptic device, telephone, mobile device, computer, smart device, computer tablet, computer laptop, computer gaming device, television, radio, two-way radio, fax machine, cellular network, mobile network, landline, wireless network, antenna, orbiting satellite, the Internet, computer server, cloud computing, virtual assistant software agent, voice-user interface, voice command device, Wi-Fi, Ethernet, Bluetooth, broadband, cable, fiber optics, digital subscriber line, local area network, or wide area network.

According to the preferred embodiments, the device can be configured to obtain a speech-to-text-to-Braille translation, according to the art, of a spoken word received from a second party via the at least one communication channel and to display the translation on the at least one Braille pad for reading by the user; and, the device can be configured to obtain a Braille-to-text to synthetic speech translation, according to the art, of the messages typed on the keyboard and to transmit the translated messages as synthesized speech via the at least one communication channel for hearing by the second party.

The preferred embodiments will be further appreciated in view of the examples and additional disclosure to follow.

Example 1

Figure 2:
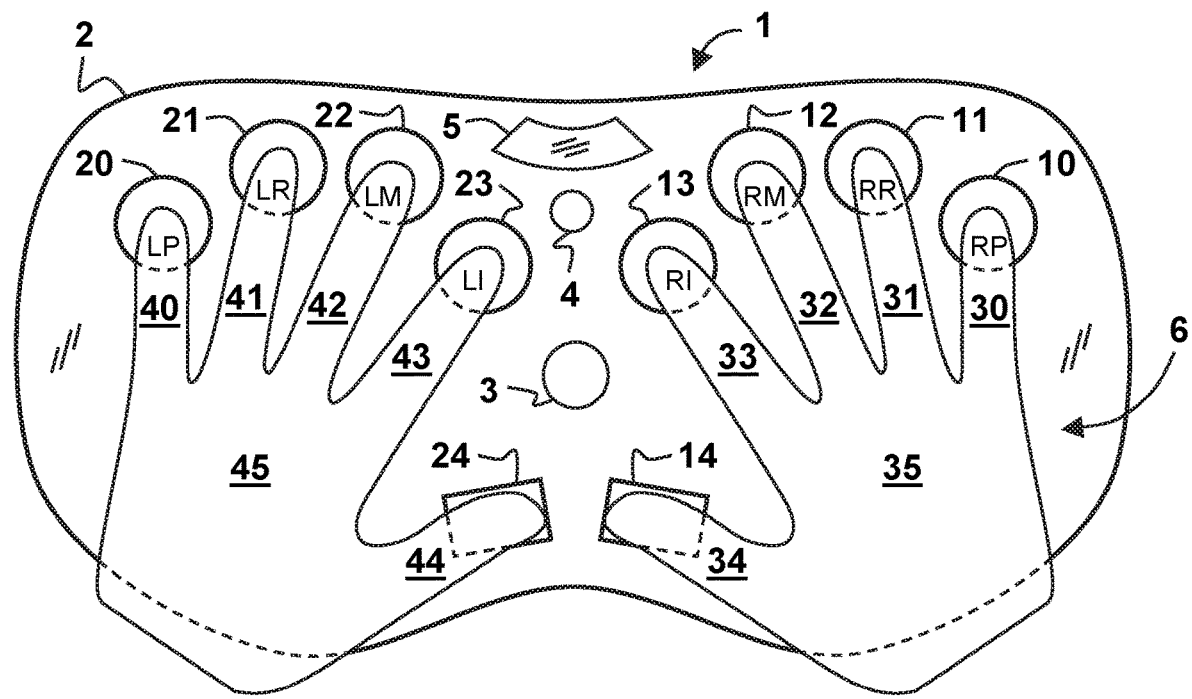
FIG. 2 is a top view of the inventive device for reading, writing, and communication by blind and deafblind users and is most descriptive of the invention.

In this disclosure, the acronym RWC (reading, writing, and communication device) is used for devices for reading, writing, and communication by deafblind users according to the invention. FIG. 2 shows a top view of an inventive RWC 1 according to this example.

Referring to FIG. 2, the RWC 1 comprises a device housing forming a user console 2 having disposed on an outside surface an ON/OFF button 3, a microphone 4, a speaker 5, an 8-key chordic keyboard having four right-hand keys 10, 11, 12, 13 and four left-hand keys 20, 21, 22, 23, and right and left self-scrolling Braille pads 14, 24. The right and left self-scrolling Braille pads 14, 24 are configured for reading with respective right and left thumbs 34, 44 and the keyboard is configured for typing with any of eight fingers other than the thumbs 34, 44, whereby with right and left hands 35, 45 resting on the user console 2 the user reads or receives text or data in Braille via the Braille pads 14, 24 and sends or composes text or data by typing on the keys 10, 11, 12, 13, 20, 21, 22, 23 of the keyboard.

The RWC 1 of this example is generally operated by the user with right and left hands 35, 45 resting on the user console 2 as shown. For the user to read text or receive messages in Braille on the RWC 1, at least one of the right or left thumbs 34, 44 is placed in tactile contact with its respective right or left self-scrolling Braille pad 14, 24 as shown. For the user to type or send messages on the RWC 1, the remaining fingers other than the thumbs are placed in contact with the keys 10, 11, 12, 13, 20, 21, 22, 23 of the keyboard as shown, such that respective keys are pressed to compose a message, text, or to invoke a function.

According to the RWC 1 of this example, the Braille pads 14, 24 are thumb-read rather than finger-read, which means each is configured for reading in tactile contact with the digital pulp of a thumb rather than the digital pulp of another finger. As best seen in FIG. 2 in view of FIG. 3, the Braille pads 14, 24 are configured for being thumb-read by disposing them on the user console 2 where the thumbs 34, 44 can rest against them for reading while the remaining fingers rest upon the keys 10, 11, 12, 13, 20, 21, 22, 23 of the keyboard for typing.

Advantageously, as shown in FIG. 2, employing thumb-read self-scrolling Braille pads 14, 24 for reading frees the remaining fingers for typing on the keys 10, 11, 12, 13, 20, 21, 22, 23 of the keyboard. Advantageously, with right and left hands 35, 45 resting on the console 2, the user's hands 35, 45 can remain poised for both reading and typing simultaneously 6, thereby eliminating the need to switch back and forth between hands poised for typing versus hands poised for reading. Advantageously, at least one of the self-scrolling Braille pads 14, 24 can be dedicated to displaying messages received from a sender in real time via a communication channel. Advantageously, compared to the prior art the RWC 1 of this example reduces the dynamic complexity experienced in reading messages received in Braille from a sender in real time, because at least one of the thumbs 34, 44 can remain in contact with at least one of the self-scrolling Braille pads 14, 24 to read the messages at the same time they are displayed. Advantageously, with at least one of the thumbs 34, 44 remaining in contact with at least one of the self-scrolling Braille pads 14, 24, the RWC 1 of this example enables duplex communication via a communication channel because the user can read or acknowledge incoming messages even while typing a reply.

According to the RWC 1 of this example, in an exemplary mode of operation one of the two Braille pads 14, 24 is configured for displaying text or data as it is typed by the user on the keyboard and the other one of the two Braille pads 14, 24 is configured for displaying other text or data. The other text or data can include, for example, messages received from a sender in real time via a communication channel or, for example, text or data retrieved from computer memory using a software application, for example, a word processor application.

Advantageously, employing dual Braille pads 14, 24 in this configuration enables typing to be reviewed on one of the two Braille pads 14, 24 as it is typed while leaving the other of the two Braille pads 14, 24 free for displaying other text or data, for example, messages from a sender being displayed in real time. Advantageously, this ability to review in real time what is being typed on the keyboard gives the user greater freedom from overlooking typing errors. Advantageously, being able to review and correct typing errors in real time while conversing with a second party promotes better fidelity and confidence in communication.

Figure 4:
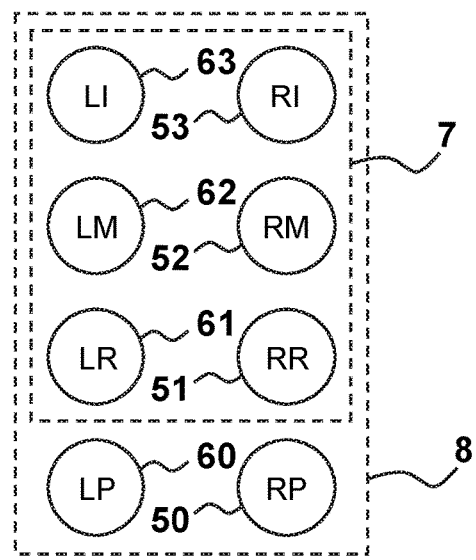
FIG. 4 is a schematic view of 6-bit and 8-bit Braille cells.

Referring to FIG. 2 in view of FIG. 4, FIG. 4 shows an exemplary correspondence between respective keys 10, 11, 12, 13, 20, 21, 22, 23 of the keyboard of the RWC 1 and corresponding Braille dots 50, 51, 52, 53, 60, 61, 62, 63 of traditional 6-bit and 8-bit Braille cells 7, 8. The correspondences are made such that the right-hand keys 10, 11, 12, 13 correspond to the right side column of the Braille cells 7, 8 and the left-hand keys 20, 21, 22, 23 correspond to the left side column of the Braille cells 7, 8. According to this example, a one-to-one correspondence between fingers, keys, and Braille dots is given as: {right pinky (RP) 30, right ring (RR) 31, right middle (RM) 32, right index (RI) 33, left pinky (LP) 40, left ring (LR) 41, left middle (LM) 42, left index (LI) 43}: {10, 11, 12, 13, 20, 21, 22, 23}:{50, 51, 52, 53, 60, 61, 62, 63}.

According to the RWC 1 of this example, rather than relying on a dedicated key such as a space bar to generate blank Braille cells or spaces when typing on the keyboard, one or more keys 10, 11, 12, 13, 20, 21, 22, 23 or key combinations are employed for this purpose. User preferences for key encoding can be set by software according to the art. For example, blank Braille cells or spaces can be generated by pressing either or both of the keys 10, 20 associated with respective right and left pinky fingers 30, 40. To give another example, the Nemeth Braille code key combination for an underscore "_" can be used to generate a blank Braille cell or space, and the underscore symbol itself can be generated by using a Nemeth Braille capital symbol followed by the underscore.

According to an exemplary method of operation, in order for the deafblind user of the RWC 1 according to this example to receive spoken word input from a second party, the second party speaks to the user in the ordinary fashion, the speech is received via the microphone 4 on the user console 2, the speech is translated into text using a speech-to-text translator according to the art, the text is translated into Braille, and the Braille translation is read by the user with the right thumb 34 using the right self-scrolling Braille pad 14; to generate spoken word output, the user types out a message in Braille on the user console 2 using the chordic keyboard, the message is translated from Braille to text, the text is translated into speech using a speech synthesizer according to the art, and the synthesized speech is then emitted from the user console 2 to the second party via the speaker 5. According to the exemplary method of operation, chordic keyboard combinations are displayed, as they are made, on the left self-scrolling Braille pad 24 for reading with the left thumb 44 so that typing can be reviewed as it is being typed. The assigned functions of the right and left self-scrolling Braille pads 14, 24 can be reversed according to user preferences.

Example 2

Figure 5:
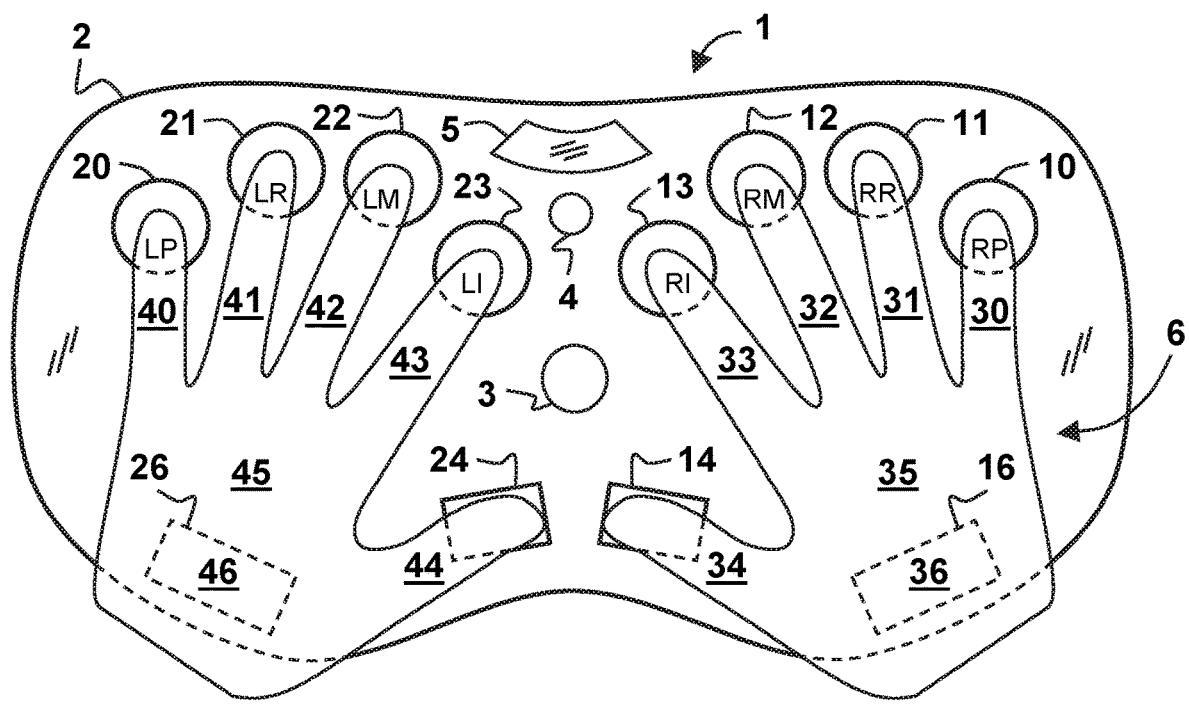
FIG. 5 is a top view of an alternate embodiment of the device of FIG. 2.

FIG. 5 shows a variation of the embodiment of the RWC 1 of Example 1, in which the user console 2 is provided with right and left space bars 16, 26 to generate blank Braille cells or spaces upon being actuated by respective right and left heels 36, 46 of the right and left hands 35, 45. The heels 36, 46 of the hands 35, 45 rest on respective space bars 16, 26. The space bars 16, 26 are actuated by exerting an increased versus decreased pressure thereon.

3. Additional Disclosure

Advantageously, for inaudible activities such as text messaging and word processing, non-deaf blind users will enjoy the same advantages as deafblind users according to the inventive method and device. Accordingly, for the benefit of users who can hear or who are not completely deaf, RWCs according to the invention can be configured to emit sounds, for example, as indicia of device functioning, for playback of recordings, or to audibly connect a call.

RWCs according to the invention are electrically powered. Exemplary power supplies include power adapters, batteries, and rechargeable batteries.

Though the RWCs of Examples 1 and 2 show chordic keyboards having 8 or 10 keys respectively, a lesser or greater number of keys can be optionally provided.

Exemplary RWCs according to the invention can be configured to connect with other devices via one or more communication channels.

RWCs according to the invention comprise alphanumeric input/output devices which can be configured according to the art as peripheral devices, stand alone computing devices, or smart devices. According to the art, exemplary peripheral devices are configured for plug-and-play or wireless connectivity; exemplary plug-and-play devices are configured for USB or lightning connectivity; exemplary wireless devices are configured for cellular, mobile broadband, Bluetooth, or Wi-Fi connectivity; exemplary stand alone computing devices are configured for mobile or desktop use; and, exemplary stand alone computing devices and smart devices are configured for Wi-Fi, Bluetooth, cellular, broadband, cable, or Ethernet connectivity.

RWCs according to the invention can be configured according to the art to include such exemplary computing technologies as microprocessors, microcontrollers, memory, software, wireless communication, mobile telecommunication, and Internet access. RWCs according to the invention can be configured according to the art for access to such exemplary resources as cloud computing, the Internet, computer databases, television, radio, closed captioning, messaging, paging, faxing, intercom, telephonic communication, teletype, and telecommunication.

Figure 3:
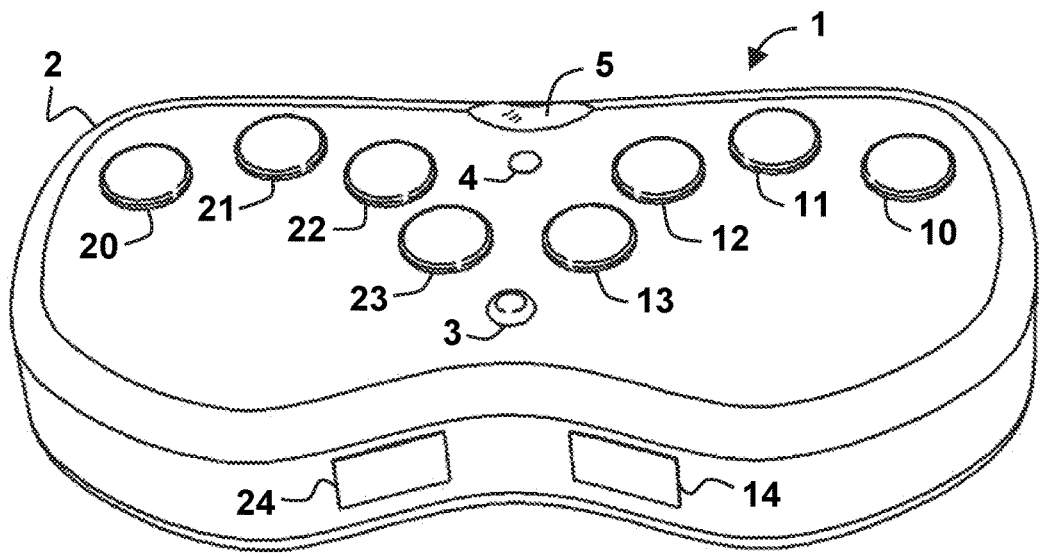
FIG. 3 is a top side-perspective view of the device of FIG. 2.

As variations of the RWCs 1 shown in FIGS. 2, 3, and 5, alternate embodiments of an RWC according to the invention are provided by swapping the functions served by the thumbs and fingers by swapping the positions of some of the keys and self-scrolling Braille pads; by employing a QWERTY keyboard for user input in combination with at least one self-scrolling Braille pad worn on the user's body for reading Braille output; or, by employing at least one self-scrolling Braille pad worn on the user's body for reading Braille output in combination with sensors for sensing finger movements or other body gestures as indicia or key states of a virtual chordic keyboard. To give an example, a finger-worn self-scrolling Braille pad can be used for reading with one of the same fingers used for typing or gesturing key states on a virtual keyboard.

Exemplary sensors for sensing movements of the fingers are provided by inertial gloves and hybrid gloves according to the art. For example, NANSENSE Inc. (Los Angeles, Calif.) makes inertial gloves comprising at least one inertial measurement unit (IMU) sensor per finger disposed within right and left gloves and positioned over each finger. The sensors capture an articulation of the fingers, which is then processed by a computer according to the art to resolve a corresponding movement of the fingers from sensor data. NANSENSE also makes hybrid gloves comprising the IMUs and flex sensors. The flex sensors provide an alternative to IMU sensors to maintain integrity in noisy magnetic environments.

Exemplary sensors for sensing movements of the fingers are further provided by miniature radar sensors. For example, Google LLC (Mountain View, Calif.) makes an interaction sensor technology called Soli using radar for motion tracking of the hand and to detect touchless gesture interactions, whereby the hand becomes an input device for interacting with technology.

In RWC embodiments in which such exemplary component devices as a microphone, speaker, keyboard, or self-scrolling Braille pad are not linked by wire, such devices can have separate power supplies and communicate wirelessly with one another according to the art. Such devices can also be worn separately in various places on the user's body.

RWCs according to the invention can be configured for telecommunication via a communication channel and employed as telephones for the deafblind. In an exemplary mode of operation, to place a telephone call the user types predefined key combinations on the chordic keyboard to initiate a call, to type or select a phone number, and to dial the number. The RWC can be configured to generate haptic signals, for example, user selectable vibration tones or patterns, to indicate ringing, connection, and disconnection. Alternatively, call status can be displayed as a message on one of the provided self-scrolling Braille pads. An auxiliary telephonic device, such as a wrist-worn mobile telephone, can signal an incoming call to the user when away from the RWC. The user can then make a gesture on the wrist-worn mobile telephone to answer the call and to alert the caller that the user will take a moment to access the RWC to continue the call. The alert can take the form of a user-defined message.

Once a call is connected, the user can send and receive messages via the RWC. The RWC can send and receive predetermined signals to determine whether a second party on the other telephone line is using Braille to send and receive messages. If so, the RWC can send and receive Braille messages directly using binary coded transmissions. Otherwise, the RWC can send and receive messages using speech-to-text-to-Braille translation and Braille-to-text to synthetic speech translation. Both methods can be employed when teleconferencing with callers having mixed access requirements.

What is claimed is:

1. A method of deafblind reading, writing, and communication, comprising:
   (a) reading with at least one self-scrolling Braille pad configured for contact with a surface of a user's body; and,
   (b) writing with a virtual keyboard using touchless gesture interactions, wherein the at least one self-scrolling Braille pad is configured to maintain contact with said surface of the user's body during the writing,
wherein the reading neither requires a swiping gesture nor restrains a part of the user's body used for the reading from performing the touchless gesture interactions used in the writing.

2. The method of claim 1, wherein the touchless gesture interactions are provided by the user's hand or digit movements.

3. The method of claim 2, wherein the touchless gesture interactions provided by the user's hand or digit movements are sensed by at least one sensor as indicia or key states of the virtual keyboard.

4. The method of claim 3, wherein said surface of the user's body is provided by a digit or wrist of the user.

5. The method of claim 4, wherein the at least one sensor is an inertial measurement unit sensor.

6. The method of claim 5, wherein the inertial measurement unit sensor is positioned over a user digit employed in performing the touchless gesture interactions and is configured for being worn by the user.

7. The method of claim 4, wherein the at least one sensor is a flex sensor.

8. The method of claim 7, wherein the flex sensor is positioned over a user digit employed in performing the touchless gesture interactions and is configured for being worn by the user.

9. The method of claim 4, wherein the at least one sensor is an inertial measurement sensor in combination with a flex sensor.

10. The method of claim 9, wherein the inertial measurement sensor and flex sensor are positioned over a user digit employed in performing the touchless gesture interactions and are configured for being worn by the user.

11. The method of claim 4, wherein the at least one sensor is a miniature radar sensor.

12. The method of claim 1, wherein the virtual keyboard is configured for operation as a virtual chordic keyboard.

13. The method of claim 4, wherein the at least one sensor is configured for being worn by the user within a glove.

14. A device for deafblind reading, writing, and communication, comprising: a virtual keyboard and at least one self-scrolling Braille pad, wherein the virtual keyboard and the at least one Braille pad are configured to allow a user to type with the virtual keyboard using touchless gesture interactions while a surface of the user's body remains in contact with the at least one Braille pad for reading, wherein the reading neither requires a swiping gesture nor restrains a part of the user's body used for the reading from performing the touchless gesture interactions used in the writing.

15. The device of claim 14, further including a computer or microcontroller configured for Braille usage and having at least one communication channel to send or receive data or messages, wherein the virtual keyboard is configured for user input and the at least one Braille pad is configured as a character display.

16. The device of claim 15, wherein the at least one communication channel is established via a microphone, speaker, signaler, haptic device, telephone, mobile device, computer, smart device, computer tablet, computer laptop, computer gaming device, television, radio, two-way radio, fax machine, cellular network, mobile network, landline, wireless network, antenna, orbiting satellite, the Internet, computer server, cloud computing, virtual assistant software agent, voice-user interface, voice command device, Wi-Fi, Ethernet, Bluetooth, broadband, cable, fiber optics, digital subscriber line, local area network, or wide area network.

17. The device for deafblind reading, writing, and communication of claim 16, being further configured to obtain a speech-to-text-to-Braille translation of a spoken word received from a second party via the at least one communication channel and to display the translation on the at least one Braille pad for reading by the user; and, being further configured to obtain a Braille-to-text to synthetic speech translation of messages typed on the virtual keyboard and to transmit the translated messages as synthesized speech via the at least one communication channel for hearing by the second party.

18. A device for deafblind reading, writing, and communication, comprising:
   a device housing;
   a chordic keyboard configured for typing with any of eight fingers other than a thumb; and,
   first and second self-scrolling Braille pads configured for reading with respective right and left thumbs;
   the keyboard and Braille pads being disposed on an outside surface of the device housing,
   whereby with hands resting on the device housing a user reads or receives text or data in Braille via the Braille pads and sends or composes text or data by typing on the keyboard.

19. The device of claim 18, further including a microphone or other communication channel for receiving words spoken by a second party, whereby the spoken words are translated via the device configured for speech-to-text-to-Braille translation and displayed in Braille on at least one of the first and second Braille pads for reading by the user; and, further including a speaker or other communication channel for transmitting sounds for hearing by the second party, whereby words typed by the user on the keyboard are translated by the device configured for Braille-to-text to synthetic speech translation and transmitted as synthetic speech on the speaker or other communication channel for hearing by the second party.

20. The device of claim 19, wherein the microphone and speaker are disposed on the outside surface of the device housing.

* * * * *